US012707536B2

(12) United States Patent
Papaleo et al.

(10) Patent No.: US 12,707,536 B2
(45) Date of Patent: Aug. 11, 2026

(54) SELECTIVE ACTIVATION OF INTELLIGENT TRANSPORT SYSTEM TECHNOLOGIES

(71) Applicant: QUALCOMM Incorporated, San Diego, CA (US)

(72) Inventors: Marco Papaleo, Bologna (IT); Michael Alexander Ruder, Pommelsbrunn (DE)

(73) Assignee: Qualcomm Incorporated, San Diego, CA (US)

( * ) Notice: Subject to any disclaimer, the term of this patent is extended or adjusted under 35 U.S.C. 154(b) by 380 days.

(21) Appl. No.: 18/366,766

(22) Filed: Aug. 8, 2023

(65) Prior Publication Data

US 2025/0056666 A1 Feb. 13, 2025

(51) Int. Cl.
*H04W 76/36* (2018.01)
*H04L 5/00* (2006.01)
*H04W 28/02* (2009.01)

(52) U.S. Cl.
CPC ........... *H04W 76/36* (2018.02); *H04L 5/0048* (2013.01); *H04W 28/0215* (2013.01)

(58) Field of Classification Search
None
See application file for complete search history.

(56) References Cited

U.S. PATENT DOCUMENTS

2020/0053527 A1 2/2020 Nylander et al.
2021/0291846 A1* 9/2021 Chan .................. B60W 60/001
2022/0330224 A1 10/2022 Ruder et al.
2022/0408447 A1 12/2022 Mueck et al.
2023/0276348 A1* 8/2023 Heo ...................... H04W 48/10 370/329
2023/0284094 A1* 9/2023 Khalid ............. H04W 36/0055 370/230
2023/0292275 A1* 9/2023 Tao ......................... H04W 8/08
2024/0416907 A1* 12/2024 Barrera ........... B60W 30/18163

OTHER PUBLICATIONS

International Search Report and Written Opinion—PCT/US2024/038338—ISA/EPO—Oct. 7, 2024.

* cited by examiner

*Primary Examiner* — Lonnie V Sweet
(74) *Attorney, Agent, or Firm* — Harrity & Harrity LLP

(57) ABSTRACT

Various aspects of the present disclosure generally relate to wireless communication. In some aspects, a user equipment (UE) may identify that the UE is within a distance threshold of an area that supports a first intelligent transport system (ITS) technology, wherein the UE has a capability to support a second ITS technology different from the first ITS technology. The UE may disable the second ITS technology based at least in part on identifying that the UE is within the distance threshold of the area. Numerous other aspects are described.

30 Claims, 9 Drawing Sheets

100
Communication Manager 140
Macro Cell
102a
Aggregated Architecture
NN
Disaggregated Architecture
NN
NN
NN
110a
Network node(s) (NNs)
110d
Relay NN
120d
UE
120e
UE
UE
120a
102b
110b
NN
120b
102c
110c
NN
120c
130
Network controller
to/from NNs

500

700

SELECTIVE ACTIVATION OF INTELLIGENT TRANSPORT SYSTEM TECHNOLOGIES

FIELD OF THE DISCLOSURE

Aspects of the present disclosure generally relate to wireless communication and to techniques and apparatuses for selective activation of intelligent transport system technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying that the UE is within a distance threshold of an area that supports a first intelligent transport system (ITS) technology, wherein the UE has a capability to support a second ITS technology different from the first ITS technology. The method may include disabling the second ITS technology based at least in part on identifying that the UE is within the distance threshold of the area.

Some aspects described herein relate to a method of wireless communication performed by a UE. The method may include identifying that the UE is outside of a distance threshold of an area that supports a first ITS technology, wherein the UE has a capability to support a second ITS technology different from the first ITS technology. The method may include enabling the second ITS technology based at least in part on identifying that the UE is outside of the distance threshold of the area.

Some aspects described herein relate to a UE for wireless communication. The UE may include one or more memories and one or more processors coupled to the one or more memories. The one or more processors may be configured to identify that the UE is within a distance threshold of an area that supports a first ITS technology, wherein the UE has a capability to support a second ITS technology different from the first ITS technology. The one or more processors may be configured to disable the second ITS technology based at least in part on identifying that the UE is within the distance threshold of the area.

Some aspects described herein relate to a UE for wireless communication. The UE may include one or more memories and one or more processors coupled to the one or more memories. The one or more processors may be configured to identify that the UE is outside of a distance threshold of an area that supports a first ITS technology, wherein the UE has a capability to support a second ITS technology different from the first ITS technology. The one or more processors may be configured to enable the second ITS technology based at least in part on identifying that the UE is outside of the distance threshold of the area.

Some aspects described herein relate to a non-transitory computer-readable medium that stores a set of instructions for wireless communication by a UE. The set of instructions, when executed by one or more processors of the UE, may cause the UE to identify that the UE is within a distance threshold of an area that supports a first ITS technology, wherein the UE has a capability to support a second ITS technology different from the first ITS technology. The set of instructions, when executed by one or more processors of the UE, may cause the UE to disable the second ITS technology based at least in part on identifying that the UE is within the distance threshold of the area.

Some aspects described herein relate to a non-transitory computer-readable medium that stores a set of instructions for wireless communication by a UE. The set of instructions, when executed by one or more processors of the UE, may cause the UE to identify that the UE is outside of a distance threshold of an area that supports a first ITS technology, wherein the UE has a capability to support a second ITS technology different from the first ITS technology. The set of instructions, when executed by one or more processors of the UE, may cause the UE to enable the second ITS technology based at least in part on identifying that the UE is outside of the distance threshold of the area.

Some aspects described herein relate to an apparatus for wireless communication. The apparatus may include means for identifying that the apparatus is within a distance threshold of an area that supports a first ITS technology, wherein the apparatus has a capability to support a second ITS technology different from the first ITS technology. The apparatus may include means for disabling the second ITS technology based at least in part on identifying that the apparatus is within the distance threshold of the area.

Some aspects described herein relate to an apparatus for wireless communication. The apparatus may include means for identifying that the apparatus is outside of a distance threshold of an area that supports a first ITS technology, wherein the apparatus has a capability to support a second ITS technology different from the first ITS technology. The apparatus may include means for enabling the second ITS technology based at least in part on identifying that the apparatus is outside of the distance threshold of the area.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
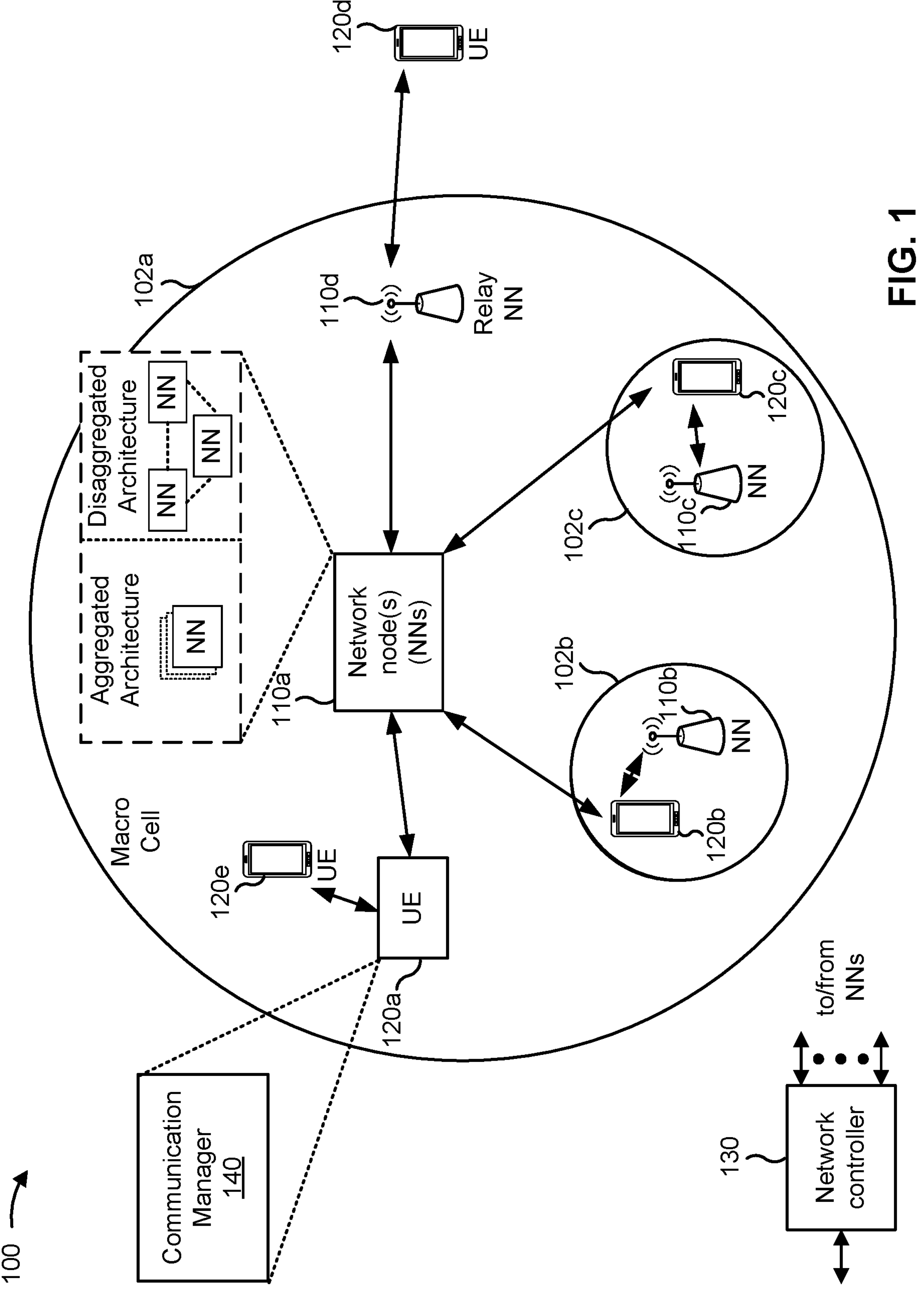
FIG. 1 is a diagram illustrating an example of a wireless network, in accordance with the present disclosure.

Vehicular based user equipments (UEs) may communicate with one another and/or with a wireless network using an intelligent transport system (ITS) technology, sometimes referred to as a road ITS technology. A road ITS technology is a technology in which information and communication technologies are applied in the field of road transport, including infrastructure, vehicles, and users, as well as traffic management, mobility management, and interfaces with other modes of transport. In some examples, a UE that has a capability of supporting an ITS technology may operate in a high frequency band (e.g., the 5.9 GHz band), sometimes referred to as an ITS band. More particularly, a road ITS technology may operate in a frequency band that includes the spectrum from 5855 MHz to 5915 MHz, with the spectrum from 5855 MHz to 5875 MHz dedicated for use for non-safety-related ITS traffic and the spectrum from 5875 MHz to 5915 MHz dedicated for use for safety-related ITS traffic.

In some examples, ITS spectrum regulation may be technology neutral. For example, European ITS spectrum regulation in the 5.9 GHz band may be technology neutral in that multiple competing ITS technologies may be employed in the 5.9 GHz band, resulting in interference, collisions, and other communication disruptions caused by the competing technologies. For example, for vehicular based UEs, certain UEs may operate in an ITS band using a fifth generation (5G) vehicle to everything (V2X) (5G-V2X) technology and/or a Long Term Evolution (LTE) V2X (LTE-V2X) technology, which may be a V2X technology associated with the Third Generation Partnership Project (3GPP) and/or with 5G and/or LTE communications, while other UEs may operate in an ITS band using an ITS 5 GHz (ITS-G5) technology, which may be an ITS technology associated with the European Telecommunications Standards Institute (ETSI) and/or the Institute of Electrical and Electronics Engineers (IEEE). Simultaneous deployment of 5G-V2X and/or LTE-V2X technologies and ITS-G5 technologies in the spectrum dedicated for use for safety related ITS traffic (e.g., 5875 MHz to 5915 MHz) may result in interfering or colliding communications, resulting in high error rates and thus high power, computing, and network resource consumption for correcting communication errors. Moreover, simultaneous deployment of multiple ITS technologies may pose safety concerns, such as by resulting in high communication error rates, leading to collisions among vehicles attempting to communicate using a 5G-V2X, LTE-V2X, and/or ITS-G5 technology.

Some techniques and apparatuses described herein enable selective activation of one or more ITS technologies, thereby reducing interference and/or communication collisions and otherwise resulting in improved ITS deployments. In some aspects, a UE, such as a vehicular based UE, may be capable of identifying that the UE is within a distance threshold (e.g., a certain number of kilometers) of an area (e.g., a country) that supports a first intelligent ITS technology, such as ITS-G5. The UE may have a capability to support a second ITS technology different from the first ITS technology, such as 5G-V2X and/or LTE-V2X. Accordingly, based at least in part on based at least in part on identifying that the UE is within the distance threshold of the area (e.g., a country that uses a 5.9 GHz band for ITS-G5 infrastructure), the UE may disable the second ITS technology (e.g., 5G-V2X and/or LTE-V2X). In this way, the UE's ITS communications may avoid interfering with other UEs' ITS communications, resulting in reduced communication errors and thus reduced power, computing, and network resource consumption for correcting communication errors, as well as overall more efficient usage of ITS spectrum.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the 3GPP, the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a V2X protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify that the UE is within a distance threshold of an area that supports a first ITS technology, wherein the UE has a capability to support a second ITS technology different from the first ITS technology; and disable the second ITS technology based at least in part on identifying that the UE is within the distance threshold of the area. Additionally, or alternatively, the communication manager 140 may identify that the UE is outside of a distance threshold of an area that supports a first ITS technology, wherein the UE has a capability to support a second ITS technology different from the first ITS technology; and enable the second ITS technology based at least in part on identifying that the UE is outside of the distance threshold of the area. Additionally, or alternatively, the communication manager 140 may perform one or more other operations described herein.

As indicated above, FIG. 1 is provided as an example. Other examples may differ from what is described with regard to FIG. 1.

Figure 2:
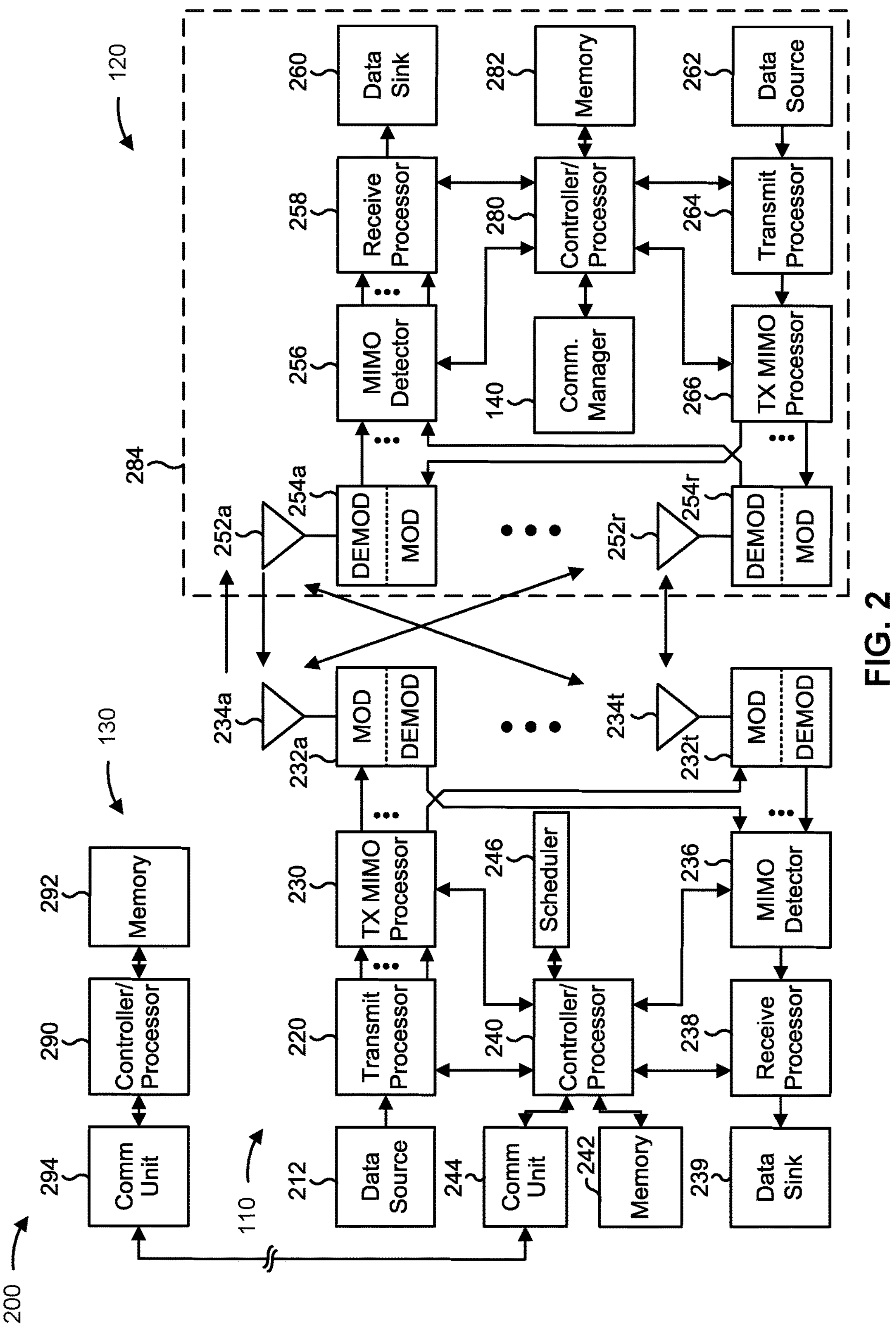
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the network node 110, the controller/processor 280 of the UE 120, and/or any other component(s) of FIG. 2 may perform one or more techniques associated with selective activation of ITS technologies, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for identifying that the UE 120 is within a distance threshold of an area that supports a first ITS technology, wherein the UE has a capability to support a second ITS technology different from the first ITS technology; and/or means for disabling the second ITS technology based at least in part on identifying that the UE 120 is within the distance threshold of the area. In some other aspects, the UE 120 includes means for identifying that the UE 120 is outside of a distance threshold of an area that supports a first ITS technology, wherein the UE 120 has a capability to support a second ITS technology different from the first ITS technology; and/or means for enabling the second ITS technology based at least in part on identifying that the UE 120 is outside of the distance threshold of the area. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
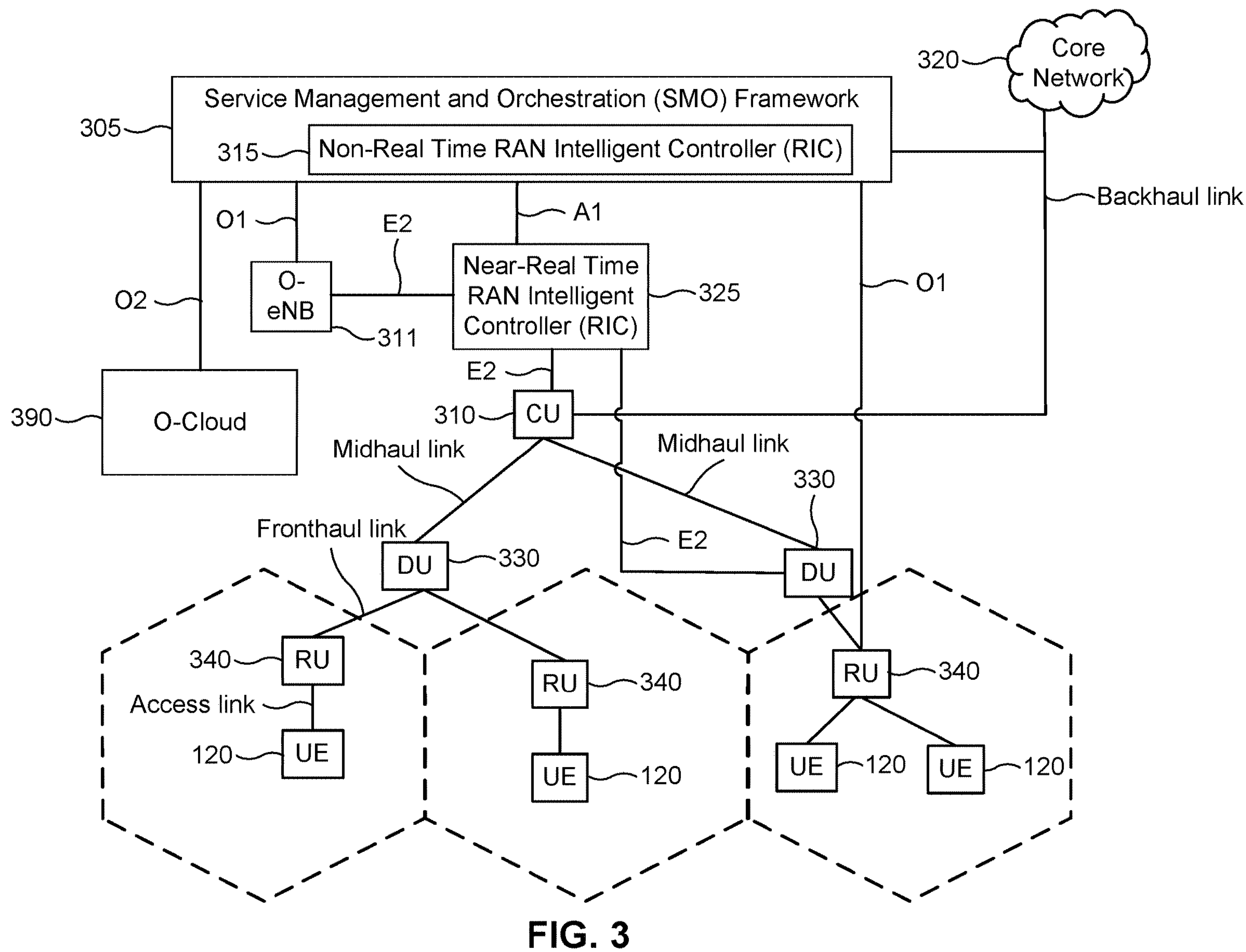
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
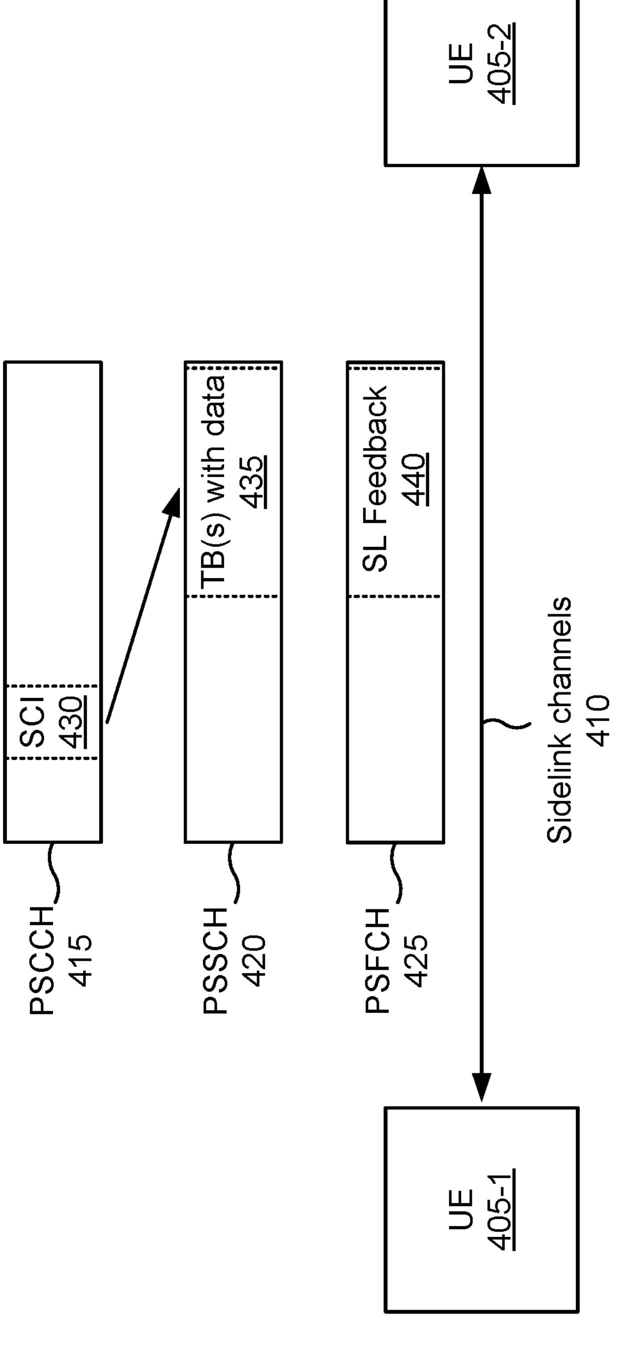
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V21 communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in an RRC message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
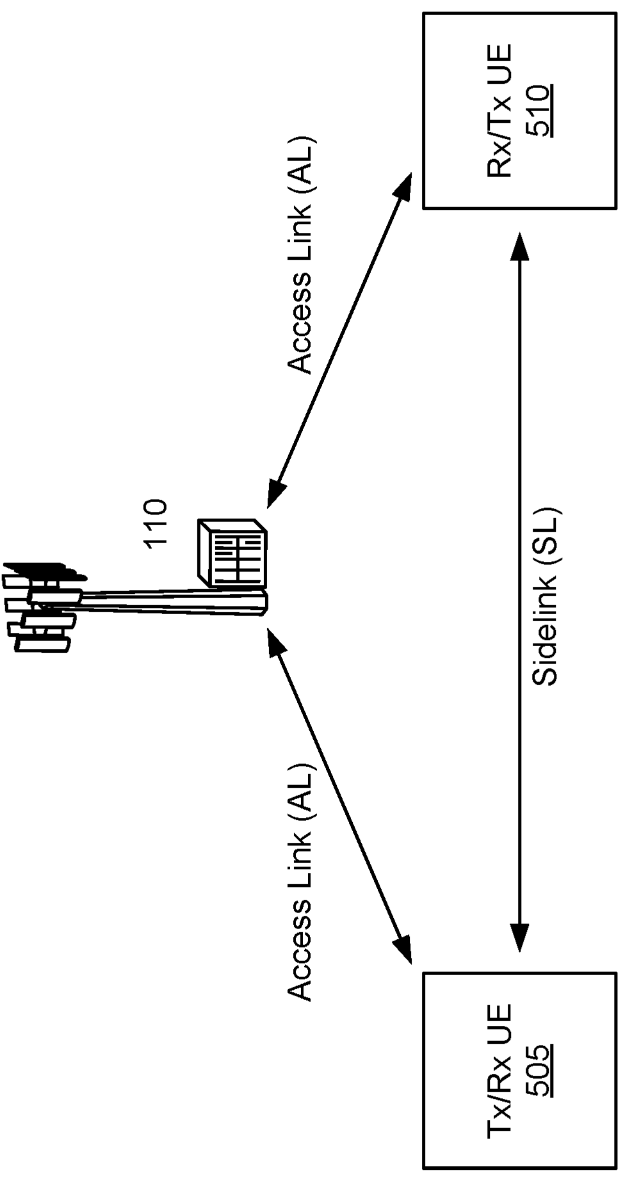
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

In some examples, such as in examples in which one of the UEs shown in FIGS. 4 and 5 is associated with a vehicle, the UE may communicate via the sidelink and/or the access link using an ITS technology, such as a road ITS technology. "ITS technology" (e.g., a road ITS technology) refers to a wireless communication technology or similar technology in which information and communication technologies are applied in the field of road transport, including infrastructure, vehicles, and users, as well as in traffic management, mobility management, and interfaces with other modes of transport. In some examples, a UE that has a capability of supporting an ITS technology may operate in a high frequency band (e.g., the 5.9 GHz band). For example, the high frequency band may be an ITS band (e.g., as defined, or otherwise fixed, by a wireless communication standard, such as the 3GPP, the ETSI, and/or the IEEE). More particularly, road ITS technologies (e.g., ITS technologies associated with vehicles on a road, as opposed to rail ITS technologies, which may be ITS technologies associated with rail vehicles) may operate in a frequency band that includes the spectrum from 5855 MHz to 5915 MHz, with the spectrum from 5855 MHz to 5875 MHz dedicated for use for non-safety-related ITS traffic and the spectrum from 5875 MHz to 5915 MHz dedicated for use for safety-related ITS traffic.

In some examples, ITS spectrum regulation may be technology neutral. For example, European ITS spectrum regulation in the 5.9 GHz band may be technology neutral, resulting in neighboring UEs utilizing multiple ITS technologies simultaneously in a same frequency band, leading to interference, collisions, and other communication disruptions. For example, certain UEs may operate in an ITS band using a 5G-V2X and/or LTE-V2X technology, which may be a V2X technology associated with the 3GPP and/or with 5G and/or LTE communications, while other UEs may operate in an ITS band using an ITS-G5 technology, which may be an ITS technology associated with the ETSI and/or the IEEE. Simultaneous deployment of 5G-V2X and/or LTE-V2X technologies and ITS-G5 technologies in the spectrum dedicated for use for safety related ITS traffic (e.g., 5875 MHz to 5915 MHz) may result in interfering or colliding communications, resulting in high error rates and thus high power, computing, and network resource consumption for correcting communication errors.

Although some attempts have been made to segment an ITS band in order to provide coexistence of various ITS technologies, doing so may result in insufficient spectrum for certain technologies. For example, the 5G Automotive Association (5GAA) has proposed reserving adjacent channels for 5G-V2X communications and ITS-G5 communications in the 5.9 GHz band, such as spectrum from 5875 MHz to 5895 MHz being reserved for use for 5G-V2X technologies and spectrum from 5895 MHz to 5905 MHz being reserved for use for ITS-G5 technologies. However, doing so may be untenable for certain technologies and/or countries. For example, Austria has indicated that Austria plans to use, in connection with its C-Roads infrastructure, all of the 40 MHz safety channels (e.g., the spectrum from 5875 MHz to 5915 MHz) for ITS-G5 technologies, and thus operation of 5G-V2X on a 20 MHz channel from 5875 MHz to 5895 MHz may interfere with certain ITS-G5 functionality (e.g., cooperation perception functions and/or automated driving support functions), resulting in colliding communications and otherwise unreliable ITS services.

Some techniques and apparatuses described herein enable selective activation of one or more ITS technologies, thereby reducing interference and/or collisions and otherwise resulting in improved ITS communications. In some aspects, a UE, such as a vehicular based UE, may include a device and/or component capable of obtaining location information, such as one or more of the devices and/or components described above in connection with the UE 120 of FIG. 2. Based at least in part on the location information, the UE may be capable of identifying that the UE is within a distance threshold (e.g., a certain number of kilometers) of an area that supports a first intelligent ITS technology, such as ITS-G5. The UE may have a capability to support a second ITS technology different from the first ITS technology, such as 5G-V2X and/or LTE-V2X. Accordingly, based at least in part on identifying that the UE is within the distance threshold of the area (e.g., a country that uses a 5.9 GHz band for ITS-G5 infrastructure), the UE may disable the second ITS technology (e.g., 5G-V2X and/or LTE-V2X). In this way, the UE may avoid interfering with the first ITS technology, resulting in reduced communication errors and thus reduced power, computing, and network resource consumption for correcting communication errors, as well as overall more efficient usage of ITS spectrum.

As indicated above, FIG. 5 is provided as an example. Other examples may differ from what is described with respect to FIG. 5.

Figure 6:
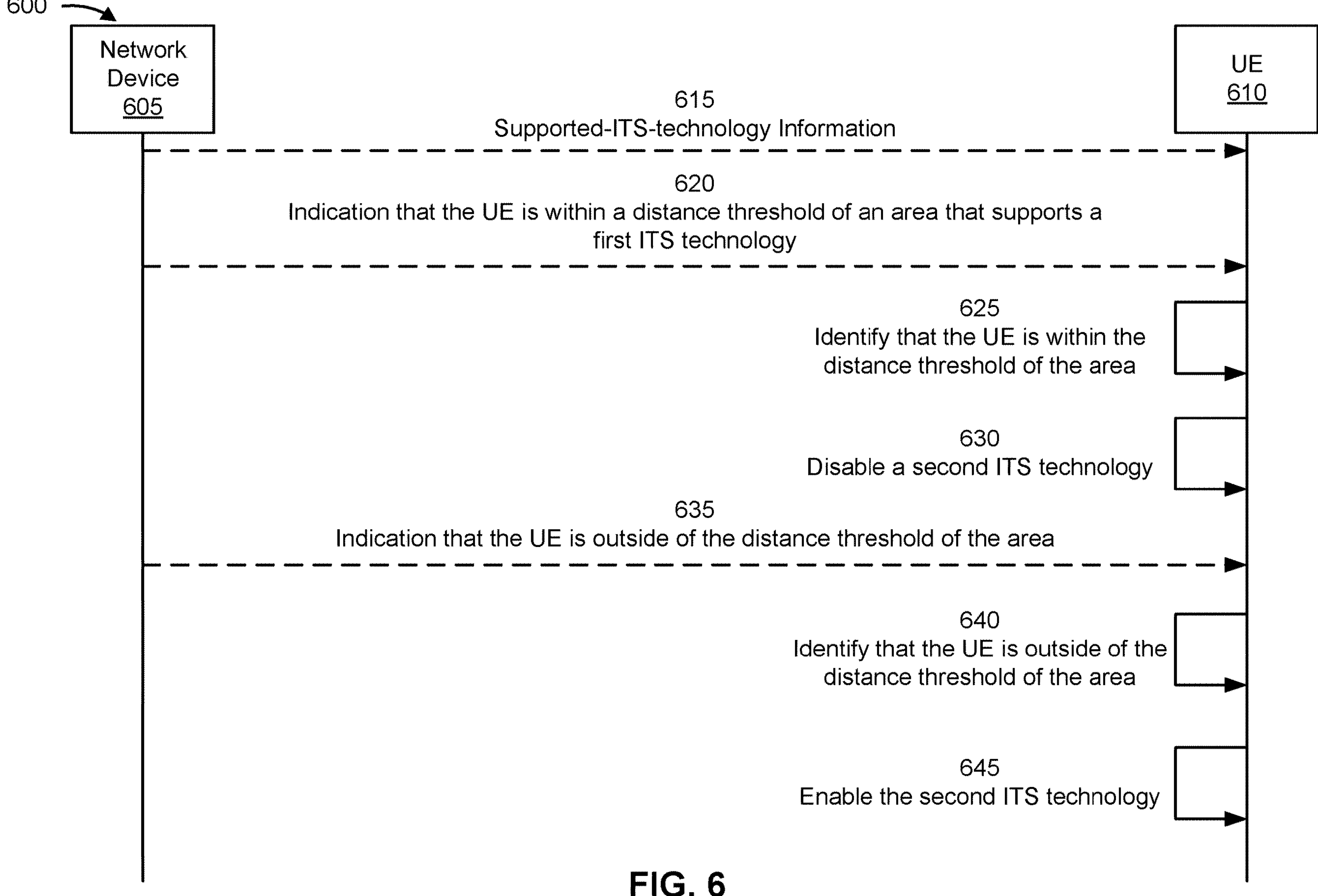
FIG. 6 is a diagram of an example associated with selective activation of intelligent transport system technologies, in accordance with the present disclosure.

FIG. 6 is a diagram of an example 600 associated with selective activation of ITS technologies, in accordance with the present disclosure. As shown in FIG. 6, a network device 605 (e.g., network node 110, a CU, a DU, a RU, a roadside unit (RSU), a UE 120, or a similar network device) may communicate with a UE 610 (e.g., UE 120). In some other aspects, the UE 610 may not necessarily be in communication with the network device 605, such as when the UE 610 is preconfigured with certain ITS information and/or determines whether to enable and/or disable an ITS technology based at least in part on a geolocation capability of the UE 610 (e.g., a GNSS capability of the UE 610), which is described in more detail below. In some aspects, the network device 605 and the UE 610 may be part of a wireless network (e.g., wireless network 100). The network device 605 and the UE 610 may have established a wireless connection prior to operations shown in FIG. 6. In some aspects, the UE 610 may be associated with a vehicle (e.g., the UE 610 may be a vehicular based UE) and/or may have a capability of supporting an ITS technology, such as a road ITS technology. For example, the UE 610 may have a capability of supporting a 5G-V2X technology, an LTE-V2X technology, an ITS-G5 technology, and/or a similar ITS technology.

As shown by reference number 615, the network device 605 may transmit, and the UE 610 may receive, supported-ITS-technology information. In some aspects, the UE 610 may receive the supported-ITS-technology information via one or more of RRC signaling, one or more MAC control elements (MAC-CEs), and/or DCI, among other examples. In some aspects, the supported-ITS-technology information may include an indication of one or more configuration parameters (e.g., already known to the UE 610 and/or previously indicated by the network device 605 or other network device) for selection by the UE 610, and/or explicit configuration information for the UE 610 to use to configure the UE 610, among other examples.

In some aspects, the supported-ITS-technology information may indicate supported ITS technologies for one or more areas (e.g., one or more geographic locations, such as one or more countries). For example, the supported-ITS-technology information may indicate that a first area (e.g., a first country) supports a first ITS technology (e.g., ITS-G5 and/or an ITS technology associated with the IEEE) in an ITS band (e.g., a 5.9 GHz band), that a second area (e.g., a second country) supports a second ITS technology (e.g., 5G-V2X and/or LTE-V2X and/or an ITS technology associated with the 3GPP) in the ITS band, that a third area (e.g., a third country) supports a both the first ITS technology and the second ITS technology (e.g., ITS-G5 and/or an ITS technology associated with the IEEE, as well as 5G-V2X and/or LTE-V2X and/or an ITS technology associated with the 3GPP) in the ITS band, and so forth. The UE 610 may store the supported-ITS-technology information, such as for a purpose of referencing the supported-ITS-technology information to determine a supported ITS technology for a given area as the UE 610 approaches the given area, which is described in more detail below. Put another way, in some aspects, the supported-ITS-technology information may be received by the UE 610 and stored at the UE 610, such that, when the UE 610 approaches a given area (e.g., a country) associated with one or more ITS technologies (e.g., one or more of the 5G-V2X and/or LTE-V2X technology or the ITS-G5 technology), information about supported ITS technologies is prestored at the UE 610 and thus accessible at the UE 610.

Additionally, or alternatively, the supported-ITS-technology information may be periodically retrieved by the UE 610, such as from an updatable database. In this regard, the updatable database may be periodically updated to include up-to-date information about supported ITS technologies in various areas, and the UE 610 may periodically access the updated information, such as via a wireless communication network or the like, in order to update and/or supplement prestored supported-ITS-technology information at the UE 610. For example, the updatable database may be periodically updated to indicate certain ITS bands associated with a given area and/or to indicate supported ITS technologies within each ITS band associated with a given area.

In some aspects, the UE 610 may be configured to selectively enable or disable one or more ITS technologies, such as for a purpose of avoiding collisions with other ITS technologies. Put another way, to avoid or minimize the risk of interference among conflicting ITS technologies, the UE 610 (e.g., a vehicle equipped to transmit 5G-V2X and/or LTE-V2X) may turn off an ITS technology (e.g., 5G-V2X and/or LTE-V2X transmissions) when approaching an area (e.g., a country) where a different ITS infrastructure (e.g., ITS-G5) is deployed in the channel allocated to the ITS technology associated with the UE 610, which is described in more detail below in connection with reference number 630.

Additionally, or alternatively, the UE 610 may be configured to receive indications that the UE 610 is approaching an area associated with a certain ITS technology, such that the UE 610 may disable and/or enable a different ITS technology, accordingly. In that regard, as shown by reference number 620, in some aspects the network device 605 may transmit, and the UE 610 may receive, an indication that the UE 610 is within a distance threshold (e.g., a certain number of kilometers or the like) of an area that supports a first ITS technology (e.g., one of ITS-G5, 5G-V2X, LTE-V2X, and/or a similar ITS technology).

In some aspects, the UE 610 may receive the indication that the UE 610 is within the distance threshold of the area via a cellular network (e.g., via cellular connectivity capabilities of the UE 610). In such aspects, the network device 605 may be associated with a network node 110 (e.g., a DU, an RU, and/or a CU), and/or the indication may be received via an RRC communication, a MAC-CE communication, a DCI communication, or a similar communication. In some other aspects, the UE 610 may receive the indication that the UE 610 is within the distance threshold of the area via a device associated with an ITS infrastructure, such as an RSU, and/or the UE 610 may receive the indication via the sidelink (e.g., in some aspects, the network device 605 may be an RSU and/or associated with an RSU). For example, the area may be a country that supports a first ITS technology (e.g., ITS-G5 and/or an ITS technology associated with the IEEE) in a certain frequency band, but not other ITS technologies (e.g., 5G-V2X and/or LTE-V2X and/or an ITS technology associated with the 3GPP) in the frequency band, and the distance threshold may be a quantity of kilometers from a border of the country. In such aspects, an RSU may be deployed near the distance threshold from the country's border, and/or the RSU may be configured to transmit messages to approaching vehicles indicating that the vehicle is approaching a country that only supports the first ITS technology (e.g., ITS-G5). As a result, the UE 610 may disable ITS technologies (e.g., 5G-V2X and/or LTE-V2X) that may collide or conflict with the first ITS technology, which is described in more detail below in connection with reference number 630.

As indicated by reference number 625, the UE 610 may identify that the UE 610 is within the distance threshold of the area that supports a first ITS technology. For example, the UE 610 may identify that the UE 610 is within a quantity of kilometers from a border of a country that supports a first ITS technology (e.g., ITS-G5) in an ITS band (e.g., the 5.9 GHz band, the safety related road ITS band from 5875 MHz to 5915 MHz, a portion thereof, or the like). In some aspects, such as in aspects in which the UE 610 received the indication described above in connection with reference number 620, the UE 610 may identify that the UE 610 is within the distance threshold of the area based at least in part on the indication. Additionally, or alternatively, the UE 610 may identify that the UE 610 is within the distance threshold of the area based at least in part on using a geolocation capability of the UE 610 (e.g., using a GNSS capability of the UE 610, or the like). For example, in aspects in which supported-ITS-technology information is prestored at the UE 610, the UE 610 may autonomously (e.g., without signaling from the network device 605) identify that the UE 610 is within a distance threshold of an area supporting a certain ITS technology by referencing the prestored supported-ITS-technology information and comparing the information to a current location of the UE 610 as determined using a geolocation capability of the UE 610.

In some aspects, in connection with the operations described above in connection with reference number 625, the UE 610 may determine an ITS band associated with the first ITS technology. For example, based at least in part on signaling received via the operations described above in connection with reference number 620, supported-ITS-technology information that is prestored at the UE 610, and/or similar information, the UE 610 may identify that the area (e.g., country) that the UE 610 is approaching supports a first ITS technology (e.g., ITS-G5) in a first frequency band (e.g., a first ITS band, such as the 5.9 GHz band and/or a portion thereof).

As indicated by reference number 630, based at least in part on identifying that the UE is within the distance threshold of the area, the UE 610 may disable a second ITS technology. More particularly, the UE 610 may have a capability to support a second ITS technology (e.g., 5G-V2X and/or LTE-V2X) that is different from the first ITS technology (e.g., ITS-G5) that is supported in the area. Accordingly, in order to avoid collisions and other conflicts with the first ITS technology infrastructure, the UE 610 may disable the second ITS technology as the UE 610 approaches the area. For example, when the area is a country that supports ITS-G5 infrastructure and the UE 610 is associated with a vehicle that supports 5G-V2X and/or LTE-V2X communications, upon approaching the country (e.g., when the UE 610 is within a quantity of kilometers from the border of the country) the UE 610 may disable the 5G-V2X and/or LTE-V2X technology in an effort to avoid disruptions to the ITS-G5 infrastructure.

In some aspects, the UE 610 may only disable the conflicting ITS technology in ITS bands that are actually in use in the area. For example, a vehicle supporting 5G-V2X and/or LTE-V2X may only turn off the transmissions in channels occupied by ITS-G5, while optionally using any channels which are dedicated to ITS-G5, but unused in the country, for 5G-V2X and/or LTE-V2X. In this regard, in aspects in which the UE 610 identifies that the first ITS technology is being deployed in a first frequency band in the area, the UE 610 may disable the second ITS technology in the first frequency band, but may enable the second ITS technology in a second frequency band that is different from the first frequency band and/or that does not conflict with the first frequency band. For example, if the UE 610 identifies that the UE 610 is approaching a country employing ITS-G5 infrastructure in a first ITS band, the UE 610 may disable 5G-V2X and/or LTE-V2X communications in the first ITS band but otherwise enable 5G-V2X and/or LTE-V2X communications in one or more other, non-conflicting ITS bands.

Additionally, or alternatively, if the UE 610 also has a capability of supporting the first ITS technology, the UE 610 may enable the first ITS technology in addition to disabling the second ITS technology. For example, vehicles supporting a combination of 5G-V2X and/or LTE-V2X and ITS-G5 may turn off 5G-V2X and/or LTE-V2X transmissions in channels occupied by ITS-G5, and may use those channels for ITS-G5 transmissions and reception. In this regard, for a UE 610 that supports both 5G-V2X and/or LTE-V2X communications and ITS-G5 communications, if the UE 610 identifies that the UE 610 is approaching a country employing ITS-G5 infrastructure in a first ITS band, the UE 610 may disable 5G-V2X and/or LTE-V2X communications in the first ITS band and may enable ITS-G5 communications in the first ITS band.

In some aspects, the UE 610 may alert a user upon disabling one or more ITS technologies. For example, when the UE 610 is a vehicular based UE, the UE 610 may alert a driver of the vehicle that one or more ITS technologies has been disabled. Returning to the above example in which the UE 610 is approaching a border of a country that supports ITS-G5, if the UE 610 disables 5G-V2X and/or LTE-V2X capabilities upon approaching the country, the UE 610 may transmit (e.g., to a driver of a vehicle associated with the UE 610) an indication that the 5G-V2X and/or LTE-V2X technology has been disabled.

Additionally, or alternatively, in some aspects, an area (e.g., a country) may mandate certain channel access techniques in certain frequency bands (e.g., ITS bands). For example, a country may mandate that a UE use a listen-before-talk (LBT) channel access technique in an ITS band, such as for a purpose of reducing ITS-based collisions in the band. In such aspects, devices not supporting LBT may disable an ITS technology upon approaching a country that mandates support of LBT. On the other hand, devices supporting the mandated channel access techniques (e.g., LBT) may be allowed to use the channels, because the LBT procedures may result in collision avoidance. Put another way, in some aspects, in connection with the operations described above in connection with reference number 625, the UE 610 may identify that the UE 610 is within a distance threshold of an area that supports an ITS technology associated with a channel access technique (e.g., one of 5G-V2X, LTE-V2X, and/or ITS-G5 associated with an LBT procedure). If, in such aspects, the UE 610 is associated with an ITS technology that does not support the channel access technique (e.g., the one of 5G-V2X, LTE-V2X, and/or ITS-G5, but that does not support an LBT procedure), the UE 610 may disable the ITS technology, in a similar manner as described above in connection with reference number 630, in order to avoid colliding transmissions in the ITS band.

In some aspects, upon leaving an area (e.g., a country), the UE 610 may enable previously disabled ITS technologies, such as an ITS technology that was disabled in order to avoid collisions within the area in the manner described above. For example, as indicated by reference number 635, the network device 605 may transmit, and the UE 610 may receive, an indication that the UE 610 is outside of the distance threshold of the area that supports the first ITS technology. For example, in a similar manner as described above in connection with reference number 620, the UE 610 may receive an indication that the UE 610 is outside of the distance threshold via a cellular network, via an RSU, and/or via similar signaling.

Moreover, as indicated by reference number 640, the UE 610 may identify that the UE 610 is outside of the distance threshold of the area that supports the first ITS technology. For example, in aspects in which the UE 610 receives the signaling described above in connection with 635, the UE 610 may identify that the UE 610 is outside of the distance threshold of the area that supports the first ITS technology based at least in part on receiving the signaling. Additionally, or alternatively, in aspects in which the UE 610 is prestored with supported-ITS-technology information, such as the supported-ITS-technology information described above in connection with reference number 615, the UE 610 may identify that the UE 610 is outside of the distance threshold of the area that supports the first ITS technology based at least in part on a geolocation capability of the UE 610, such as GNSS functionality of the UE 610.

As indicated by reference number 645, based at least in part on identifying that the UE 610 is outside of the distance threshold of the area, the UE 610 may enable the second ITS technology. For example, when leaving a country that supports ITS-G5, upon traveling a certain distance away from the border, the UE 610 may enable 5G-V2X and/or LTE-V2X or a similar ITS technology. Moreover, as described above in connection with reference numbers 625 and 630, disabling certain ITS technologies may include only disabling the ITS technologies in conflicting frequency bands. Accordingly, in such aspects, enabling the second ITS technology (e.g., 5G-V2X and/or LTE-V2X) may include enabling the second ITS technology in the conflicting frequency band(s). Put another way, in aspects in which the UE 610 identifies that the area (e.g., country) supports the first ITS technology (e.g., ITS-G5) in a first frequency band (e.g., a first ITS band, such as part or all of the safety related ITS band from 5875 MHz to 5915 MHz), the UE 610 may enable another ITS technology (e.g., 5G-V2X and/or LTE-V2X) within that band based at least in part on determining that the UE 610 has traveled a sufficient distance away from the area such that there is little or no risk of colliding ITS communications.

Based at least in part on the UE 610 selectively activating one or more ITS technologies as described above, the UE 610 and/or other network devices may conserve computing, power, network, and/or communication resources that may have otherwise been consumed as a result of conflicting ITS technologies. For example, based at least in part on the UE 610 selectively activating one or more ITS technologies as described above, the UE 610 and/or other network devices may employ ITS technologies with a reduced error rate, which may conserve computing, power, network, and/or communication resources that may have otherwise been consumed to detect and/or correct communication errors.

As indicated above, FIG. 6 is provided as an example. Other examples may differ from what is described with respect to FIG. 6.

Figure 7:
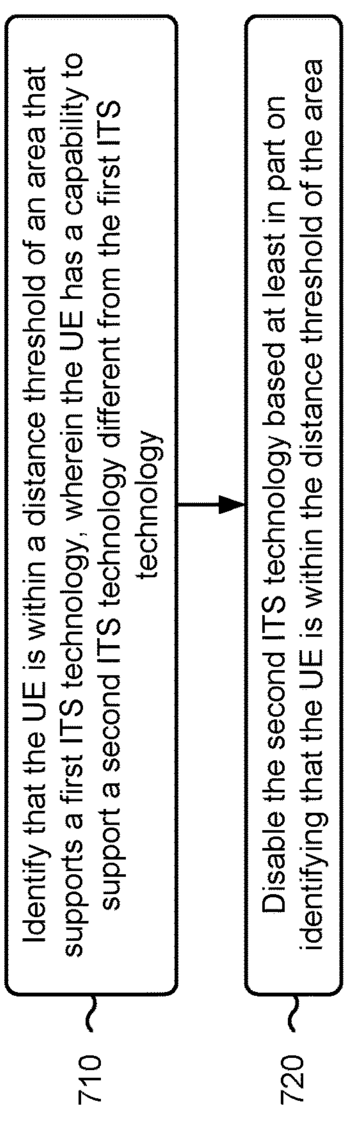
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 610) performs operations associated with selective activation of ITS technologies.

As shown in FIG. 7, in some aspects, process 700 may include identifying that the UE is within a distance threshold of an area that supports a first ITS technology, wherein the UE has a capability to support a second ITS technology different from the first ITS technology (block 710). For example, the UE (e.g., using communication manager 906, depicted in FIG. 9) may identify that the UE is within a distance threshold of an area that supports a first ITS technology, wherein the UE has a capability to support a second ITS technology different from the first ITS technology, as described above.

As further shown in FIG. 7, in some aspects, process 700 may include disabling the second ITS technology based at least in part on identifying that the UE is within the distance threshold of the area (block 720). For example, the UE (e.g., using communication manager 906, depicted in FIG. 9) may disable the second ITS technology based at least in part on identifying that the UE is within the distance threshold of the area, as described above.

Process 700 may include additional aspects, such as any single aspect or any combination of aspects described below and/or in connection with one or more other processes described elsewhere herein.

In a first aspect, one of the first ITS technology or the second ITS technology is one of a 5G-V2X technology, an LTE-V2X technology, or an ITS-G5 technology, and the other one of the first ITS technology or the second ITS technology is a different one of the 5G-V2X technology, the LTE-V2X technology, or the ITS-G5 technology.

In a second aspect, alone or in combination with the first aspect, the UE is associated with a vehicle.

In a third aspect, alone or in combination with one or more of the first and second aspects, process 700 includes identifying that the area supports the first ITS technology in a first frequency band, wherein disabling the second ITS technology includes disabling the second ITS technology in the first frequency band, and wherein process 700 further comprises enabling the second ITS technology in a second frequency band different from the first frequency band.

In a fourth aspect, alone or in combination with one or more of the first through third aspects, process 700 includes identifying that the area supports the first ITS technology in a first frequency band, wherein disabling the second ITS technology includes disabling the second ITS technology in the first frequency band, wherein the UE has a capability to support the first ITS technology, and wherein process 700 further comprises enabling the first ITS technology in the first frequency band.

In a fifth aspect, alone or in combination with one or more of the first through fourth aspects, identifying that the UE is within the distance threshold of the area is based at least in part on stored information at the UE.

In a sixth aspect, alone or in combination with one or more of the first through fifth aspects, process 700 includes receiving, from a database, information that indicates that the area supports the first ITS technology, wherein identifying that the UE is within the distance threshold of the area is based at least in part on the information.

In a seventh aspect, alone or in combination with one or more of the first through sixth aspects, process 700 includes receiving, via a cellular network, an indication that the UE is within the distance threshold of the area, wherein identifying that the UE is within the distance threshold of the area is based at least in part on the indication.

In an eighth aspect, alone or in combination with one or more of the first through seventh aspects, process 700 includes receiving, via a roadside unit, an indication that the UE is within the distance threshold of the area, wherein identifying that the UE is within the distance threshold of the area is based at least in part on the indication.

In a ninth aspect, alone or in combination with one or more of the first through eighth aspects, the area is a country, and the distance threshold is associated with a distance from a border of the country.

In a tenth aspect, alone or in combination with one or more of the first through ninth aspects, identifying that the UE is within the distance threshold of the area is performed based at least in part on a geolocation capability of the UE.

In an eleventh aspect, alone or in combination with one or more of the first through tenth aspects, process 700 includes transmitting an indication that the second ITS technology has been disabled based at least in part on disabling the second ITS technology.

In a twelfth aspect, alone or in combination with one or more of the first through eleventh aspects, the first ITS technology is an ITS technology that supports a channel access technique, and the second ITS technology is an ITS technology that does not support the channel access technique.

In a thirteenth aspect, alone or in combination with one or more of the first through twelfth aspects, one of the first ITS technology or the second ITS technology is a technology associated with the Third Generation Partnership Project, and the other one of the first ITS technology or the second ITS technology is technology associated with the Institute of Electrical and Electronics Engineers.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
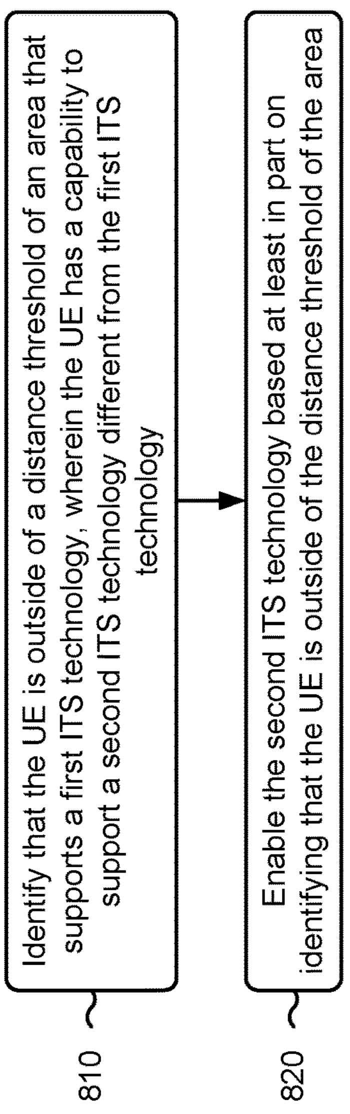
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 610) performs operations associated with selective activation of ITS technologies.

As shown in FIG. 8, in some aspects, process 800 may include identifying that the UE is outside of a distance threshold of an area that supports a first ITS technology, wherein the UE has a capability to support a second ITS technology different from the first ITS technology (block 810). For example, the UE (e.g., using communication manager 906, depicted in FIG. 9) may identify that the UE is outside of a distance threshold of an area that supports a first ITS technology, wherein the UE has a capability to support a second ITS technology different from the first ITS technology, as described above.

As further shown in FIG. 8, in some aspects, process 800 may include enabling the second ITS technology based at least in part on identifying that the UE is outside of the distance threshold of the area (block 820). For example, the UE (e.g., using communication manager 906, depicted in FIG. 9) may enable the second ITS technology based at least in part on identifying that the UE is outside of the distance threshold of the area, as described above.

Process 800 may include additional aspects, such as any single aspect or any combination of aspects described below and/or in connection with one or more other processes described elsewhere herein.

In a first aspect, one of the first ITS technology or the second ITS technology is one of a 5G-V2X technology, an LTE-V2X technology, or an ITS-G5 technology, and the other one of the first ITS technology or the second ITS technology is a different one of the 5G-V2X technology, the LTE-V2X technology, or the ITS-G5 technology.

In a second aspect, alone or in combination with the first aspect, the UE is associated with a vehicle.

In a third aspect, alone or in combination with one or more of the first and second aspects, process 800 includes identifying that the area supports the first ITS technology in a first frequency band, and enabling the second ITS technology includes enabling the second ITS technology in the first frequency band.

In a fourth aspect, alone or in combination with one or more of the first through third aspects, identifying that the UE is outside of the distance threshold of the area is based at least in part on stored information at the UE.

In a fifth aspect, alone or in combination with one or more of the first through fourth aspects, process 800 includes receiving, from a database, information that indicates that the area supports the first ITS technology, wherein identifying that the UE is outside of the distance threshold of the area is based at least in part on the information.

In a sixth aspect, alone or in combination with one or more of the first through fifth aspects, process 800 includes receiving, via a cellular network, an indication that the UE is outside of the distance threshold of an area, wherein identifying that the UE is outside of the distance threshold of the area is based at least in part on the indication.

In a seventh aspect, alone or in combination with one or more of the first through sixth aspects, process 800 includes receiving, via a roadside unit, an indication that the UE is outside of the distance threshold of an area, wherein identifying that the UE is outside of the distance threshold of the area is based at least in part on the indication.

In an eighth aspect, alone or in combination with one or more of the first through seventh aspects, the area is a country, and the distance threshold is associated with a distance from a border of the country.

In a ninth aspect, alone or in combination with one or more of the first through eighth aspects, identifying that the UE is outside of the distance threshold of the area is performed based at least in part on a geolocation capability of the UE.

In a tenth aspect, alone or in combination with one or more of the first through ninth aspects, the first ITS technology is an ITS technology that supports a channel access technique, and the second ITS technology is an ITS technology that does not support the channel access technique.

In an eleventh aspect, alone or in combination with one or more of the first through tenth aspects, one of the first ITS technology or the second ITS technology is a technology associated with the Third Generation Partnership Project, and the other one of the first ITS technology or the second ITS technology is technology associated with the Institute of Electrical and Electronics Engineers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
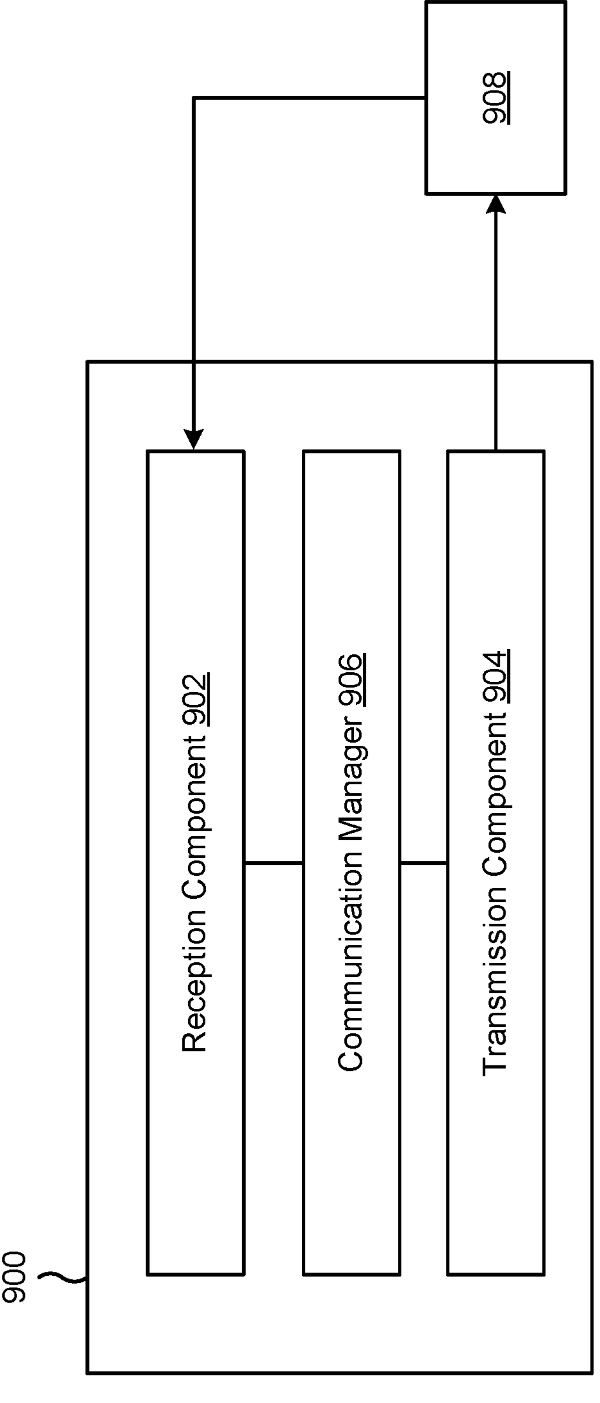
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE 120 described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may identify that the UE is within a distance threshold of an area that supports a first ITS technology, wherein the UE has a capability to support a second ITS technology different from the first ITS technology. The communication manager 906 may disable the second ITS technology based at least in part on identifying that the UE is within the distance threshold of the area.

The communication manager 906 may identify that the area supports the first ITS technology in a first frequency band. The communication manager 906 may enable the second ITS technology in a second frequency band different from the first frequency band. The communication manager 906 may enable the first ITS technology in the first frequency band.

The reception component 902 may receive, from a database, information that indicates that the area supports the first ITS technology, wherein identifying that the UE is within the distance threshold of the area is based at least in part on the information.

The reception component 902 may receive, via a cellular network, an indication that the UE is within the distance threshold of the area, wherein identifying that the UE is within the distance threshold of the area is based at least in part on the indication.

The reception component 902 may receive, via a roadside unit, an indication that the UE is within the distance threshold of the area, wherein identifying that the UE is within the distance threshold of the area is based at least in part on the indication.

The transmission component 904 may transmit an indication that the second ITS technology has been disabled based at least in part on disabling the second ITS technology.

The communication manager 906 may identify that the UE is outside of a distance threshold of an area that supports a first ITS technology, wherein the UE has a capability to support a second ITS technology different from the first ITS technology. The communication manager 906 may enable the second ITS technology based at least in part on identifying that the UE is outside of the distance threshold of the area.

The communication manager 906 may identify that the area supports the first ITS technology in a first frequency band, wherein enabling the second ITS technology includes enabling the second ITS technology in the first frequency band.

The reception component 902 may receive, from a database, information that indicates that the area supports the first ITS technology, wherein identifying that the UE is outside of the distance threshold of the area is based at least in part on the information.

The reception component 902 may receive, via a cellular network, an indication that the UE is outside of the distance threshold of the area, wherein identifying that the UE is outside of the distance threshold of the area is based at least in part on the indication.

The reception component 902 may receive, via a roadside unit, an indication that the UE is outside of the distance threshold of the area, wherein identifying that the UE is outside of the distance threshold of the area is based at least in part on the indication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: identifying that the UE is within a distance threshold of an area that supports a first ITS technology, wherein the UE has a capability to support a second ITS technology different from the first ITS technology; and disabling the second ITS technology based at least in part on identifying that the UE is within the distance threshold of the area.

Aspect 2: The method of Aspect 1, one of the first ITS technology or the second ITS technology is one of a 5G-V2X technology, an LTE-V2X technology, or an ITS-G5 technology, and wherein the other one of the first ITS technology or the second ITS technology is a different one of the 5G-V2X technology, the LTE-V2X technology, or the ITS-G5 technology.

Aspect 3: The method of any of Aspects 1-2, wherein the UE is associated with a vehicle.

Aspect 4: The method of any of Aspects 1-3, further comprising identifying that the area supports the first ITS technology in a first frequency band, wherein disabling the second ITS technology includes disabling the second ITS technology in the first frequency band, and wherein the method further comprises enabling the second ITS technology in a second frequency band different from the first frequency band.

Aspect 5: The method of any of Aspects 1-4, further comprising identifying that the area supports the first ITS technology in a first frequency band, wherein disabling the second ITS technology includes disabling the second ITS technology in the first frequency band, wherein the UE has a capability to support the first ITS technology, and wherein the method further comprises enabling the first ITS technology in the first frequency band.

Aspect 6: The method of any of Aspects 1-5, wherein identifying that the UE is within the distance threshold of the area is based at least in part on stored information at the UE.

Aspect 7: The method of any of Aspects 1-6, further comprising receiving, from a database, information that indicates that the area supports the first ITS technology, wherein identifying that the UE is within the distance threshold of the area is based at least in part on the information.

Aspect 8: The method of any of Aspects 1-7, further comprising receiving, via a cellular network, an indication that the UE is within the distance threshold of the area, wherein identifying that the UE is within the distance threshold of the area is based at least in part on the indication.

Aspect 9: The method of any of Aspects 1-8, further comprising receiving, via a roadside unit, an indication that the UE is within the distance threshold of the area, wherein identifying that the UE is within the distance threshold of the area is based at least in part on the indication.

Aspect 10: The method of any of Aspects 1-9, wherein the area is a country, and wherein the distance threshold is associated with a distance from a border of the country.

Aspect 11: The method of any of Aspects 1-10, wherein identifying that the UE is within the distance threshold of the area is performed based at least in part on a geolocation capability of the UE.

Aspect 12: The method of any of Aspects 1-11, further comprising transmitting an indication that the second ITS technology has been disabled based at least in part on disabling the second ITS technology.

Aspect 13: The method of any of Aspects 1-12, wherein the first ITS technology is an ITS technology that supports a channel access technique, and wherein the second ITS technology is an ITS technology that does not support the channel access technique.

Aspect 14: The method of any of Aspects 1-13, wherein one of the first ITS technology or the second ITS technology is a technology associated with the Third Generation Partnership Project, and wherein the other one of the first ITS technology or the second ITS technology is technology associated with the Institute of Electrical and Electronics Engineers.

Aspect 15: A method of wireless communication performed by a UE, comprising: identifying that the UE is outside of a distance threshold of an area that supports a first ITS technology, wherein the UE has a capability to support a second ITS technology different from the first ITS technology; and enabling the second ITS technology based at least in part on identifying that the UE is outside of the distance threshold of the area.

Aspect 16: The method of Aspect 15, wherein one of the first ITS technology or the second ITS technology is one of a 5G-V2X technology, an LTE-V2X technology, or an ITS-G5 technology, and wherein the other one of the first ITS technology or the second ITS technology is a different one of the 5G-V2X technology, the LTE-V2X technology, or the ITS-G5 technology.

Aspect 17: The method of any of Aspects 15-16, wherein the UE is associated with a vehicle.

Aspect 18: The method of any of Aspects 15-17, further comprising identifying that the area supports the first ITS technology in a first frequency band, and wherein enabling the second ITS technology includes enabling the second ITS technology in the first frequency band.

Aspect 19: The method of any of Aspects 15-18, wherein identifying that the UE is outside of the distance threshold of the area is based at least in part on stored information at the UE.

Aspect 20: The method of any of Aspects 15-19, further comprising receiving, from a database, information that indicates that the area supports the first ITS technology, wherein identifying that the UE is outside of the distance threshold of the area is based at least in part on the information.

Aspect 21: The method of any of Aspects 15-20, further comprising receiving, via a cellular network, an indication that the UE is outside of the distance threshold of the area, wherein identifying that the UE is outside of the distance threshold of the area is based at least in part on the indication.

Aspect 22: The method of any of Aspects 15-21, further comprising receiving, via a roadside unit, an indication that the UE is outside of the distance threshold of the area, wherein identifying that the UE is outside of the distance threshold of the area is based at least in part on the indication.

Aspect 23: The method of any of Aspects 15-22, wherein the area is a country, and wherein the distance threshold is associated with a distance from a border of the country.

Aspect 24: The method of any of Aspects 15-23, wherein identifying that the UE is outside of the distance threshold of the area is performed based at least in part on a geolocation capability of the UE.

Aspect 25: The method of any of Aspects 15-24, wherein the first ITS technology is an ITS technology that supports a channel access technique, and wherein the second ITS technology is an ITS technology that does not support the channel access technique.

Aspect 26: The method of any of Aspects 15-25, wherein one of the first ITS technology or the second ITS technology is a technology associated with the Third Generation Partnership Project, and wherein the other one of the first ITS technology or the second ITS technology is technology associated with the Institute of Electrical and Electronics Engineers.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive, from a database, information that indicates that an area supports a first intelligent transport system (ITS) technology;

identify that the UE is within a distance threshold of the area that supports the first ITS technology, wherein the UE has a capability to support a second ITS technology different from the first ITS technology, and wherein the UE is identified to be within the distance threshold of the area based at least in part on the information; and disable the second ITS technology based at least in part on identifying that the UE is within the distance threshold of the area.

2. The UE of claim 1, wherein one of the first ITS technology or the second ITS technology is one of a fifth generation vehicle-to-everything (5G-V2X) technology, a Long Term Evolution vehicle-to-everything (LTE-V2X) technology, or an ITS 5 gigahertz (ITS-G5) technology, and wherein the other one of the first ITS technology or the second ITS technology is a different one of the 5G-V2X technology, the LTE-V2X technology, or the ITS-G5 technology.

3. The UE of claim 1, wherein the UE is associated with a vehicle.

4. The UE of claim 1, wherein the one or more processors are further configured to identify that the area supports the first ITS technology in a first frequency band, wherein the one or more processors, to disable the second ITS technology, are configured to disable the second ITS technology in the first frequency band, and wherein one or more processors are further configured to enable the second ITS technology in a second frequency band different from the first frequency band.

5. The UE of claim 1, wherein the one or more processors are further configured to identify that the area supports the first ITS technology in a first frequency band, wherein the one or more processors, to disable the second ITS technology, are configured to disable the second ITS technology in the first frequency band, wherein the UE has a capability to support the first ITS technology, and wherein the one or more processors are further configured to enable the first ITS technology in the first frequency band.

6. The UE of claim 1, wherein, to identify that the UE is within the distance threshold of the area, the one or more processors are configured to identify that the UE is within the distance threshold of the area based at least in part on stored information at the UE.

7. The UE of claim 1, wherein the one or more processors are further configured to receive, via a cellular network, an indication that the UE is within the distance threshold of the area, wherein, to identify that the UE is within the distance threshold of the area, the one or more processors are configured to identify that the UE is within the distance threshold of the area based at least in part on the indication.

8. The UE of claim 1, wherein the one or more processors are further configured to receive, via a roadside unit, an indication that the UE is within the distance threshold of the area, wherein, to identify that the UE is within the distance threshold of the area, the one or more processors are configured to identify that the UE is within the distance threshold of the area based at least in part on the indication.

9. The UE of claim 1, wherein the area is a country, and wherein the distance threshold is associated with a distance from a border of the country.

10. The UE of claim 1, wherein, to identify that the UE is within the distance threshold of the area, the one or more processors are configured to identify that the UE is within the distance threshold of the area based at least in part on a geolocation capability of the UE.

11. The UE of claim 1, wherein the one or more processors are further configured to transmit an indication that the second ITS technology has been disabled based at least in part on disabling the second ITS technology.

12. The UE of claim 1, wherein the first ITS technology is an ITS technology that supports a channel access technique, and wherein the second ITS technology is an ITS technology that does not support the channel access technique.

13. The UE of claim 1, wherein one of the first ITS technology or the second ITS technology is a technology associated with the Third Generation Partnership Project, and wherein the other one of the first ITS technology or the second ITS technology is technology associated with the Institute of Electrical and Electronics Engineers.

14. A user equipment (UE) for wireless communication, comprising:

one or more memories; and one or more processors, coupled to the one or more memories, configured to:

receive, from a database, information that indicates that an area supports a first intelligent transport system (ITS) technology;

identify that the UE is outside of a distance threshold of an area that supports the first ITS technology, wherein the UE has a capability to support a second ITS technology different from the first ITS technology, and wherein the UE is identified to be outside of the distance threshold of the area based at least in part on the information; and enable the second ITS technology based at least in part on identifying that the UE is outside of the distance threshold of the area.

15. The UE of claim 14, wherein one of the first ITS technology or the second ITS technology is one of a fifth generation vehicle-to-everything (5G-V2X) technology, a Long Term Evolution vehicle-to-everything (LTE-V2X) technology, or an ITS 5 gigahertz (ITS-G5) technology, and wherein the other one of the first ITS technology or the second ITS technology is a different one of the 5G-V2X technology, the LTE-V2X technology, or the ITS-G5 technology.

16. The UE of claim 14, wherein the UE is associated with a vehicle.

17. The UE of claim 14, wherein the one or more processors are further configured to identify that the area supports the first ITS technology in a first frequency band, and wherein the one or more processors, to enable the second ITS technology, are configured to enable the second ITS technology in the first frequency band.

18. The UE of claim 14, wherein, to identify that the UE is outside of the distance threshold of the area, the one or more processors are configured to identify that the UE is outside of the distance threshold of the area based at least in part on stored information at the UE.

19. The UE of claim 14, wherein the one or more processors are further configured to receive, via a cellular network, an indication that the UE is outside of the distance threshold of the area, wherein, to identify that the UE is outside of the distance threshold of the area, the one or more processors are configured to identify that the UE is outside of the distance threshold of the area based at least in part on the indication.

20. The UE of claim 14, wherein the one or more processors are further configured to receive, via a roadside unit, an indication that the UE is outside of the distance threshold of the area, wherein, to identify that the UE is outside of the distance threshold of the area, the one or more processors are configured to identify that the UE is outside of the distance threshold of the area based at least in part on the indication.

21. The UE of claim 14, wherein the area is a country, and wherein the distance threshold is associated with a distance from a border of the country.

22. The UE of claim 14, wherein, to identify that the UE is outside of the distance threshold of the area, the one or more processors are configured to identify that the UE is outside of the distance threshold of the area based at least in part on a geolocation capability of the UE.

23. The UE of claim 14, wherein the first ITS technology is an ITS technology that supports a channel access technique, and wherein the second ITS technology is an ITS technology that does not support the channel access technique.

24. The UE of claim 14, wherein one of the first ITS technology or the second ITS technology is a technology associated with the Third Generation Partnership Project, and wherein the other one of the first ITS technology or the second ITS technology is technology associated with the Institute of Electrical and Electronics Engineers.

25. A method of wireless communication performed by a user equipment (UE), comprising:

receiving, from a database, information that indicates that an area supports a first intelligent transport system (ITS) technology;

identifying that the UE is within a distance threshold of the area that supports the first ITS technology, wherein the UE has a capability to support a second ITS technology different from the first ITS technology, and wherein the UE is identified to be within the distance threshold of the area based at least in part on the information; and disabling the second ITS technology based at least in part on identifying that the UE is within the distance threshold of the area.

26. The method of claim 25, wherein one of the first ITS technology or the second ITS technology is a technology associated with the Third Generation Partnership Project, and wherein the other one of the first ITS technology or the second ITS technology is technology associated with the Institute of Electrical and Electronics Engineers.

27. The method of claim 25, further comprising:

receiving, via a cellular network, an indication that the UE is within the distance threshold of the area, wherein the UE is identified to be is within the distance threshold of the area based at least in part on the indication.

28. A method of wireless communication performed by a user equipment (UE), comprising:

receive, from a database, information that indicates that an area supports a first intelligent transport system (ITS) technology;

identifying that the UE is outside of a distance threshold of an area that supports the first ITS technology, wherein the UE has a capability to support a second ITS technology different from the first ITS technology, and wherein the UE is identified to be outside of the distance threshold of the area based at least in part on the information; and enabling the second ITS technology based at least in part on identifying that the UE is outside of the distance threshold of the area.

29. The method of claim 28, wherein one of the first ITS technology or the second ITS technology is a technology associated with the Third Generation Partnership Project, and wherein the other one of the first ITS technology or the second ITS technology is technology associated with the Institute of Electrical and Electronics Engineers.

30. The method of claim 28, further comprising:

receiving, via a cellular network, an indication that the UE is outside of the distance threshold of the area, wherein the UE is identified to be outside of the distance threshold of the area based at least in part on the indication.

* * * * *